US006995659B2

(12) United States Patent
Soto-Nicolas

(10) Patent No.: US 6,995,659 B2
(45) Date of Patent: Feb. 7, 2006

(54) SOUND GENERATING TRANSDUCER

(75) Inventor: Alberto Soto-Nicolas, Tampere (FI)

(73) Assignee: Nokia Corporation, Espoo (FI)

( * ) Notice: Subject to any disclaimer, the term of this patent is extended or adjusted under 35 U.S.C. 154(b) by 192 days.

(21) Appl. No.: 10/698,347

(22) Filed: Oct. 31, 2003

(65) Prior Publication Data

US 2005/0094843 A1 May 5, 2005

(51) Int. Cl.
*H04B 3/36* (2006.01)

(52) U.S. Cl. ................. 340/423; 340/384.6; 340/388.1; 340/388.4; 340/392.4; 340/384.1; 381/345; 381/351; 381/424

(58) Field of Classification Search ................. 340/423, 340/384.6, 388.1, 388.4, 392.4, 384.1; 381/345, 381/351, 424
See application file for complete search history.

(56) References Cited

U.S. PATENT DOCUMENTS

| | | | | |
|---|---|---|---|---|
| 3,859,477 A | | 1/1975 | Skvor | |
| 3,978,353 A | | 8/1976 | Kinoshita | |
| 4,010,334 A | * | 3/1977 | Demeter | 381/396 |
| 5,132,942 A | | 7/1992 | Cassone | |
| 5,744,700 A | * | 4/1998 | Carme et al. | 73/40.5 A |
| 6,038,330 A | | 3/2000 | Meucci, Jr. | |
| 6,263,085 B1 | | 7/2001 | Weffer | |
| 6,532,292 B1 | | 3/2003 | Lygas | |
| 2003/0103637 A1 | | 6/2003 | Huang | |

FOREIGN PATENT DOCUMENTS

| | | |
|---|---|---|
| DE | 2345850 | 3/1975 |
| SE | 518940 | 12/2002 |
| WO | WO 2004040941 | 5/2004 |

* cited by examiner

*Primary Examiner*—Tai T. Nguyen
(74) *Attorney, Agent, or Firm*—Alfred A. Fressola; Ware, Fressola, Van Der Sluys & Adolphson LLP

(57) ABSTRACT

A sound transducer comprises at least one sound unit based on at least one radially sound emitting diaphragm arranged in a substantially cylindrical or tubular form, the diaphragm including electromechanically converting material capable of creating sound by changing its physical state upon electrical excitation. In a single sound unit the diaphragm is arranged to be supported between an inner sound guiding sleeve and an outer sound guiding sleeve in order to form at least one axial acoustic channel between the diaphragm and at least one of the sleeves. At least at the exit side of the acoustic channel the axial ends of the diaphragm and the corresponding sound guiding sleeve are arranged to have mutual non-alignment in the plane perpendicular to the axis of the sound unit in order to reduce the acoustic mass that the acoustic channel represents. The invention further relates to a device with such a transducer.

28 Claims, 5 Drawing Sheets

SOUND GENERATING TRANSDUCER

TECHNICAL FIELD

The present invention relates to a sound transducer employing one or more sound emitting elements, i.e. diaphragms or other sound radiating surfaces arranged in a substantially cylindrical or tubular form. The invention is more particularly concerned with such sound transducers, where the sound emitting elements are based on the use of piezoelectric or other electromechanically converting materials which are capable of creating sound by changing their physical state upon electrical excitation. The invention further relates to a device with acoustic capabilities comprising at least one sound transducer of the aforementioned type.

BACKGROUND OF THE INVENTION

Modern piezoelectric materials open possibilities to the evolution of acoustic transduction systems. In particular, the manufacture of thin piezoelectric sheets of polyvinylidene fluoride (PVDF) has been determinant for the development of new kind of sound and vibration generating elements. Reasons for this are related to the properties of this material, including its flexibility, ruggedness, softness, light weight, as well as its strong piezoelectricity.

In the development of piezoelectric actuators and, in particular, sound emitting drivers, the applications of said materials are somewhat more limited. One of the reasons for this is that even though the progress in the development of the piezoelectric materials has been rather significant, the small active sound generating movements, i.e. low displacements provided by the diaphragms made of such materials, .do not enable the generation of high sound levels. Especially in the low frequency range, the sound levels created with prior art type piezoelectric drivers cannot compete with those generated with other well-known, typically electrodynamic transduction principles. Still, piezoelectric sound transducers find many applications in areas, where especially small size, low power consumption and economical construction are more important than high volume level sound reproduction.

Sound transducers employing radiating surfaces arranged in a cylindrical or tubular form are already known in the art for certain applications.

U.S. Pat. No. 5,132,942 discloses an electroacoustic transducer, which utilizes a sound generating vibratory unit formed of a circular piezoelectric stack consisting of several hollow ceramic cylinders fitted inside an outer metal sleeve tube. The interior space within the piezoelectric stack is a closed space filled with air or air entraining foam in order to provide a medium that reflects interiorly directed sound waves outwards. The transducer operates omnidirectionally emitting the sound waves in the direction of the radius of its cylindrical shape. Because of its capability to provide high energy, low frequency sound waves, said transducer is especially suitable for geological and other exploration type applications, where hermetically potted, immersed transducers are required.

U.S. Pat. No. 3,978,353 presents a speaker system with a piezoelectric diaphragm supported in a cylindrical, radially sound emitting form and provided with a plurality of vibration regions arranged along the circumference of the cylindrically shaped structure in order to control the directional patterns of the speaker. Despite of the improved control over the directional properties, by its basic character the speaker system still remains as a radially emitting structure, which for many applications suffers from the inherent limitations of such structure.

The sound transducers described in the following patents employ cylindrical or tubular diaphragms, but instead of being radially sound emitting, they are arranged to radiate sound axially.

U.S. Pat. No. 6,532,292 describes a method and apparatus to transmit audio signals into a human ear. The apparatus comprises a first frequency generator driving a first cylindrical element, said first element generating a first ultrasonic acoustic field. The apparatus further comprises a second frequency generator driving a second cylindrical element for generating a second ultrasonic acoustic field. Said second element is positioned concentrically respect to said first element. The second ultrasonic acoustic field and first ultrasonic acoustic field are both directed into the ear canal of the listener, where said fields interact with each other producing audible modulation that can be detected by the ear. Instead of being radially sound emitting, the concentric elements in this solution may be characterized to be axially radiating. The main object of U.S. Pat. No. 6,532,292 is to provide an apparatus, which generates audio signal inside a listener's ear canal, and thereby effectively reduces echo and better ensures the privacy of the audio signal. The major drawback of the solution according to U.S. Pat. No. 6,532,292 is related to the fact that, correspondingly, it always requires the presence of the ear canal. In other words its applications are merely limited to different type of ear pieces. The scheme also requires a rather complicated driving scheme including frequency filtering and mixing circuits in other to accomplish correct type of modulation between the acoustic fields. Taken into account this and also the variation of the acoustic properties of individual human ear canals, a high quality and high level sound reproduction is likely to be rather challenging.

U.S. Pat. No. 3,859,477 describes another sound transducer having a cylindrical overall shape and emitting sound from the frontal ends thereof. Here, first a sheet-like assembly comprising at least a fixed electrode, a sound generating diaphragm and an intermediate spacer is constructed. Then, the transducer is constructed from the aforementioned assembly by spirally winding said assembly around a central core and into a cylindrical shape. Consequently, a rather large effective area of a diaphragm can be realized in a rather compactly sized transducer. However, the manufacturing of such transducers requires the winding of the sheet-like assembly in a specified spiral-like manner in order to produce transducers with consistent acoustical properties. The spirally wound construction also involves some significant limitations with respect to the acoustical properties of the transducer, especially with respect to the acoustic mass experienced by the diaphragm. The concept of acoustic mass will be discussed in more detail later in this text.

SUMMARY OF THE INVENTION

The main purpose of the invention is to provide a novel kind of sound generating transducer which can overcome many of the limitations present in the aforementioned prior art devices. The invention proposes a novel way to align the cylindrical and concentrically arranged elements in order to optimise the vibration properties of the sound generating membranes and further the characteristics of the combined sound flow exiting axially from the device. Especially, the invention aims to increase the sound pressure level generated by the transducer. The invention further relates to a device with acoustic capabilities comprising at least one sound transducer of the aforementioned type.

More particularly, a solution is presented to enhance the sound production levels in acoustic push/pull drivers made from piezo-polymeric or similar electromechanically converting materials. Even if the problems related to the low displacement of the diaphragms still remain because of the properties of such active materials themselves, sound levels achieved with the new arrangements according to the invention are high enough to develop head phones or miniature speakers suitable, for example, to be used as speakers in mobile phones or other portable devices. Also, the frequency bandwidth of the devices can be controlled better than in the prior art devices. The invention provides possibilities to achieve sound with low distortion and large frequency bandwidth.

The basic idea of the invention can be related to the principle of arranging a substantially cylindrically or tubularly shaped electromechanical sound generating diaphragm between an inner sound guiding sleeve and an outer sound guiding sleeve, said sleeves having substantially similar radial cross-sectional shape with said diaphragm. The tubular sound unit structure formed in this way is typically arranged with end retainers or supports holding the diaphragm and the inner and outer sleeves in place and allowing the sound waves generated by the diaphragm, which is arranged to vibrate mainly in the radial direction, to travel axially in-between the diaphragm and said sleeves and finally through the end retainers axially out from the sound unit and the transducer. Therefore, the sound waves exiting from the aforementioned sound unit/transducer propagates substantially perpendicular to the displacement of the electromechanical diaphragm.

According to one embodiment of the invention several sound generating diaphragms together with related sound guiding sleeves are arranged in the radial direction within each other, typically concentrically, in order to increase the sound level or sound properties of the transducer. In other words, a sound transducer according to the invention may comprise several radially successive sound generating units arranged within each other in order to couple said sound units acoustically in parallel. These transducers are referred to here shortly as multi-diaphragm transducers. The invention may also be applied to single diaphragm transducers, but it is especially useful in the aforementioned multi-diaphragm transducers.

The key of the invention lies in the special mutual alignment of the diaphragm and the sound guiding sleeves at the opposite axial ends of a sound unit, i.e. at the front and back side ends of the unit. When a diaphragm is supported with end retainers or corresponding support means with respect to the sound guiding sleeves according a typical embodiment of the invention, said alignment is primarily characterized by the fact that at the front side end the outer sound guiding sleeve of each concentric sound unit is arranged not to cover the diaphragm support means (end retainer) attached typically to the inner sound guiding sleeve. Similarly, at the rear side the inner sound guiding sleeve is arranged not to cover the diaphragm support means attached to the outer sound guiding sleeve. In other words, the ends of the inner and outer sound guiding sleeves are arranged to have an alternating mutual non-alignment in the axial direction. This special non-alignment reduces significantly the acoustic mass that the diaphragm of a single sound unit is required to move in order to create axially propagating sound waves. Thanks to the reduced acoustic mass, the efficiency of the sound unit is improved and higher sound levels can be created. Depending on how the support for the diaphragm is arranged, the mutual non-alignment may include or not include the axial width of the diaphragm support means.

When two sound units are arranged physically concentrically, and therefore acoustically in parallel, the inner sound guiding sleeve of the outer unit can be used as the outer sound guiding sleeve of the inner unit. In other words, in concentrically arranged sound units the outer sound guiding sleeve of the inner unit can be thought to be "removed" and replaced by the inner sound guiding sleeve of the outer unit when the inner unit is arranged concentrically inside the outer unit. When more units are arranged in parallel, it can be done following the same principle. Therefore, the current invention provides completely new possibilities to combine the axial sound flow from several sound units together in order to increase the total sound level of the transducer.

According to another embodiment of the invention directed to a transducer employing several radially successive sound generating units, different electrical drive signals are used to drive the different diaphragms. The drive signals may differ in their frequency bandwidth or equalization, or in their relative signal amplitude.

In practical embodiments of the invention the size and exact shape of the individual diaphragms and the surrounding sound guiding sleeves may vary within a range depending on the application. The cross-sectional shape of said elements does not need to be exactly circular, nor does it have to be exactly the same in all radially successive units. The axial location of the radially successive elements, i.e. diaphragms or sleeves, or the acoustic units formed thereof, may also vary respect to each other.

The present invention enables to increase the sound level of a transducer by adding several concentric diaphragms. Because the power consumption when electrically exciting piezoelectric materials is low, the total electric power consumption of the transducer is not increased significantly. Combined sound flow from a transducer can also be increased without decrease in the performance in terms of distortion (sound quality) and/or safety and liability of the product. For example, head phones employing such sound transducers are easier to built and manufacture than those implementing traditional transducers. Lower price of manufacture of the sound transducers is also expected.

More details of the present invention are set forth in the foregoing description and in the accompanying drawings describing selected embodiments of the invention. The preferred embodiments and possible variants of the invention will become more apparent to a person skilled in the art also through the appended claims.

DETAILED DESCRIPTION OF THE PREFERRED EMBODIMENTS

In the following the invention is described mainly using a set of head phones as an example. In these examples the sound is reproduced by means of concentric piezoelectric push/pull drivers and the sound waves are arranged to propagate out from said sound units perpendicular to the displacement of the diaphragms. Each of these sound units typically comprises a cylindrical sheet of a piezopolymer material clamped in a rigid frame. The piezopolymer material is preferably polyvinylidene fluoride (PVDF). The sound flow generated by each concentric driver contributes to the total sound flow produced by the head phones and observed by the listener. In this way it is possible to reach higher sound volume levels without increasing significantly the total size of the device. The use of the piezopolymer material allows the generation of sound with very low distortion at low, medium and high frequencies and with low electrical power consumption.

Figure 1:
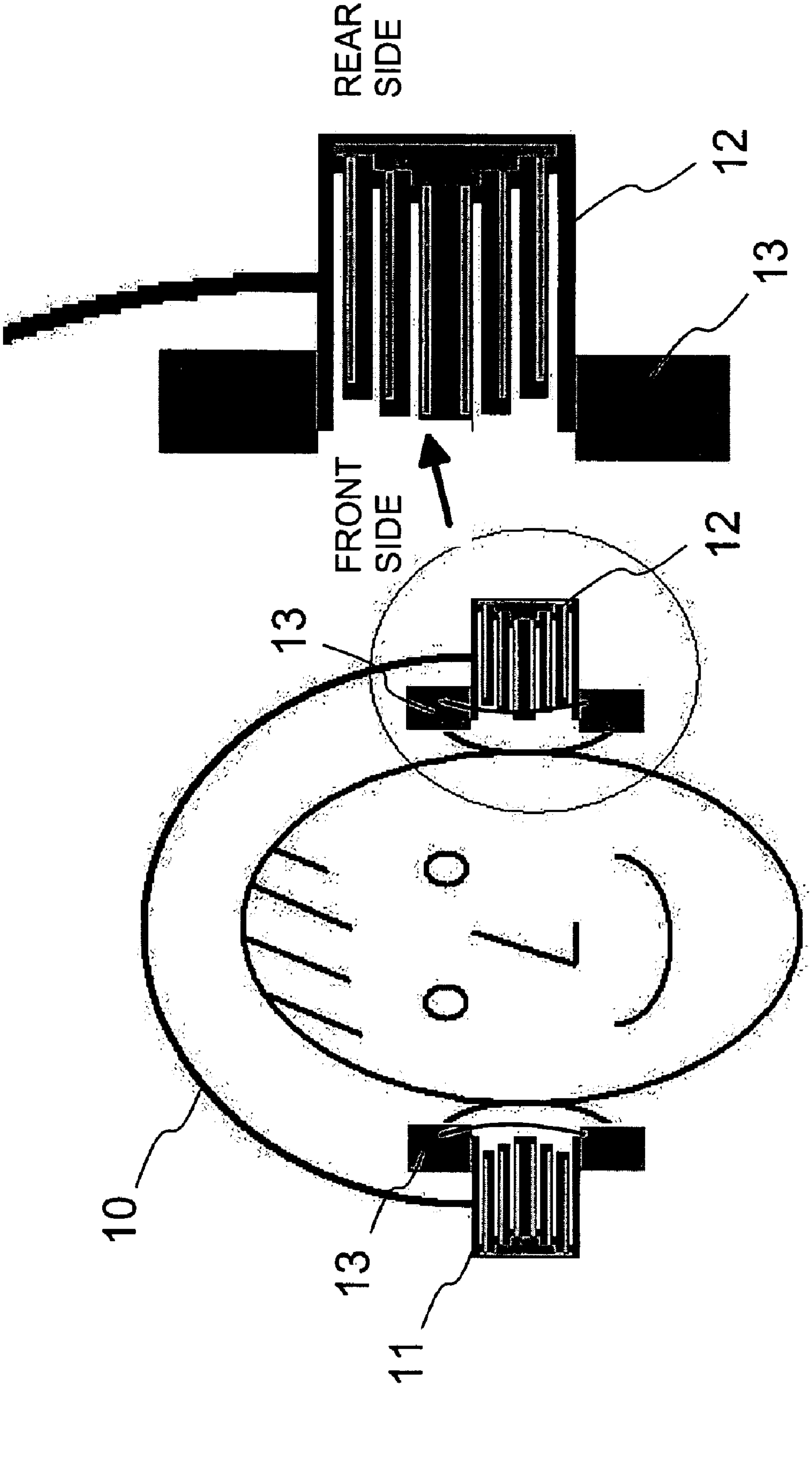
FIG. 1 describes schematically the construction of a set of head phones with two ear pieces, each comprising a multi-diaphragm sound transducer according to the invention, FIG. 2 describes schematically a single diaphragm sound transducer according to the invention featuring axial non-alignment for acoustic mass reduction, FIG. 3 clarifies schematically the concept and location of acoustic mass in an acoustic driver, FIG. 4 describes schematically how two sound units are combined into a multi-diaphragm sound transducer according to the invention, and FIG. 5 describes schematically in a perspective view one possible practical construction of certain parts of a sound transducer according to the invention.

FIG. 1 describes schematically the construction of a set of head phones 10 consisting of two ear pieces 11,12. A single ear piece 11,12 is made according to the invention from a set of concentric drivers, i.e. from several radially successive sound units. Each of these arrangements 11,12 may also be referred to as a multi-diaphragm transducer. The ear pieces/transducers 11,12 are preferably finished by their front sides pointing towards the listener's ear by adapters 13 enabling comfortable sealing and cushioning. The right side of FIG. 1 shows in a longitudinal cross sectional view more specifically the construction of a single ear piece 12 consisting in this case from three radially successive sound units.

Figure 2:
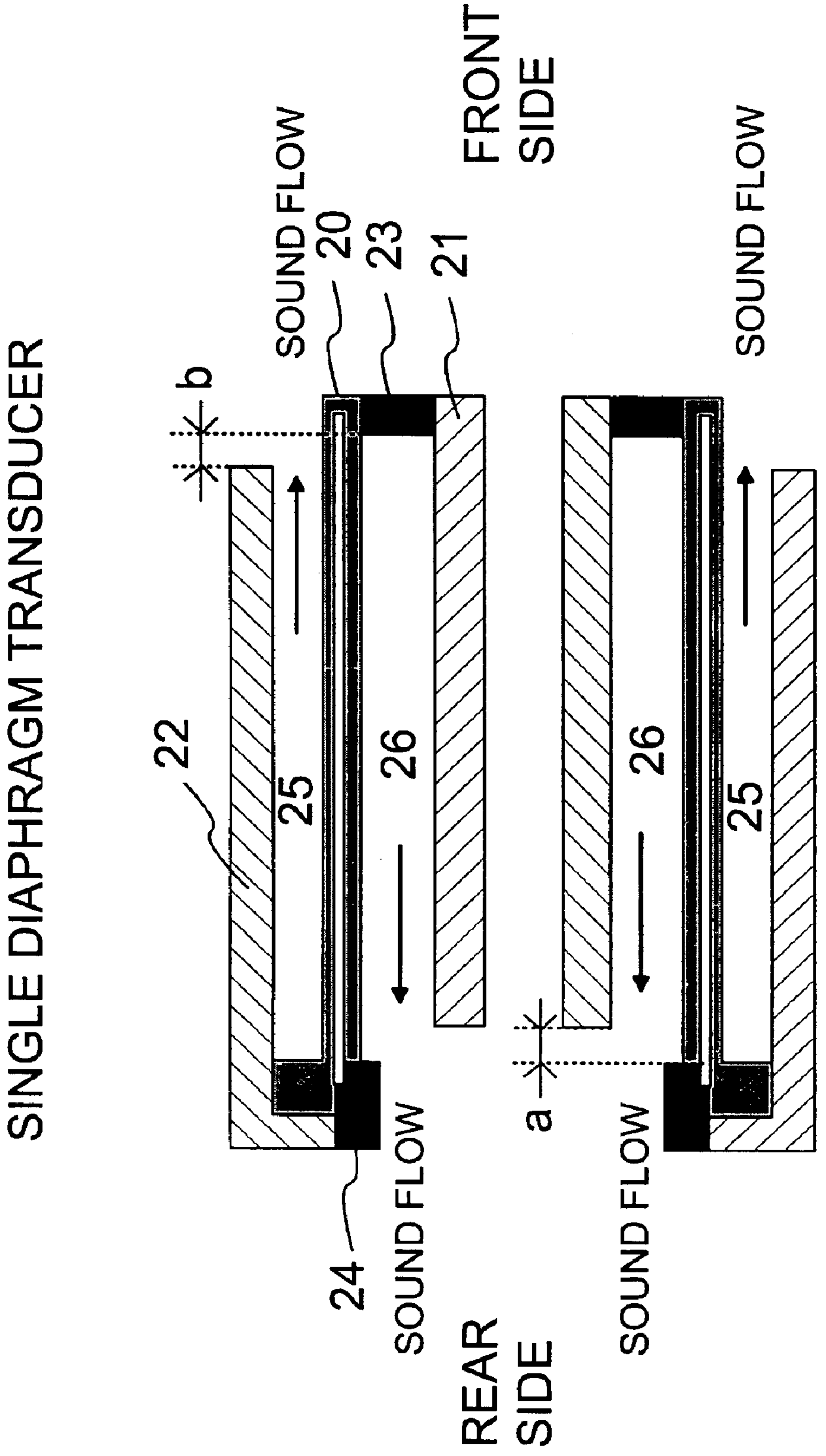

FIG. 2 describes in a more detailed longitudinal cross sectional view one possible construction of a single diaphragm sound transducer according to the invention. A substantially cylindrically or tubularly shaped electromechanical sound generating diaphragm 20 is arranged between an inner sound guiding sleeve 21 and an outer sound guiding sleeve 22, said sleeves 21,22 having substantially similar radial cross-sectional shape than said diaphragm. The inner sound guiding sleeve 21 is arranged with one (front) retainer 23 located at the front side of said sleeve for holding the diaphragm 20. Another (rear) retainer 24 is located at the other end of the diaphragm 20 between the diaphragm and the outer sound guiding sleeve 22.

The rear retainer 24 is arranged to be separated from the inner sound guiding sleeve 21 by an axial distance "a" as shown in FIG. 2. The outer sound guiding sleeve 22 is attached to the rear retainer 24 and said sleeve is arranged to cover the entire axial length of the diaphragm 20 except for a distance "b". This distance b is also the axial distance between the front retainer 23 and the outer sound guiding sleeve 22.

The diaphragm 20 is preferably made of a piezopolymer material, for example PVDF, and the various frame parts of the device can be of a suitable rigid material, preferably metal or plastic. When excited with suitable electrical signal, the diaphragm 20 operates like a radially pulsating push/pull diaphragm, i.e. a radially pulsating cylinder located between a pair of sound guiding sleeves 21,22. The sound wave generated by one of side of a diaphragm 20 is arranged to radiate along an acoustic front channel 25. This open front channel 25 is arranged to guide the sound towards the front side of the transducer, said front side facing towards the ear of the listener. The sound wave generated by the other side of the diaphragm 20 is guided into a acoustic rear channel 26. The rear channel 26 may be an open channel directed towards the rear side of the transducer away from the listener, or it may be arranged as a closed air or absorption material chamber in order to attenuate the sound waves.

The axial non-alignment of the aforementioned inner and outer sound guiding sleeves 21,22, which is characteristic for the invention and important in order to reduce the acoustic mass seen by the diaphragm 20, may be expressed with said dimensions a and b having values $a \geqq 0$ and $b \geqq 0$. If a=0 and/or b=0 then the axial width of the front and rear retainers 23, 24 alone build up the required non-alignment.

The concept of the acoustic mass is explained in the following in more detail. A tube or channel with the end connected to a cavity or opened free field behaves mainly like an "acoustic mass" when its dimensions are small compared to the wavelength of the sound wave. Consider a sound transducer, a loudspeaker arranged into one end of the tube and emitting sound into the tube. Under such conditions, the sound pressure inside the tube is substantially constant inside the tube and along the length of the tube. From the point of view of the analysis, the air inside the tube behaves like a substantially incompressible fluid of a certain density. In other words, the sound pressure inside the tube does not vary but the fluid moves as a whole when the diaphragm of the loudspeaker is trying to push this "mass of fluid" along said tube. From the point of view of the "motor" driving the diaphragm of the loudspeaker (magnet+coil or a piezoelectric mechanism etc.) it looks like the mass of the diaphragm of the loudspeaker increases due to the aforementioned effect of the acoustic mass. The motor "feels" that it should push a mass larger than that of the diaphragm alone.

Figure 3:
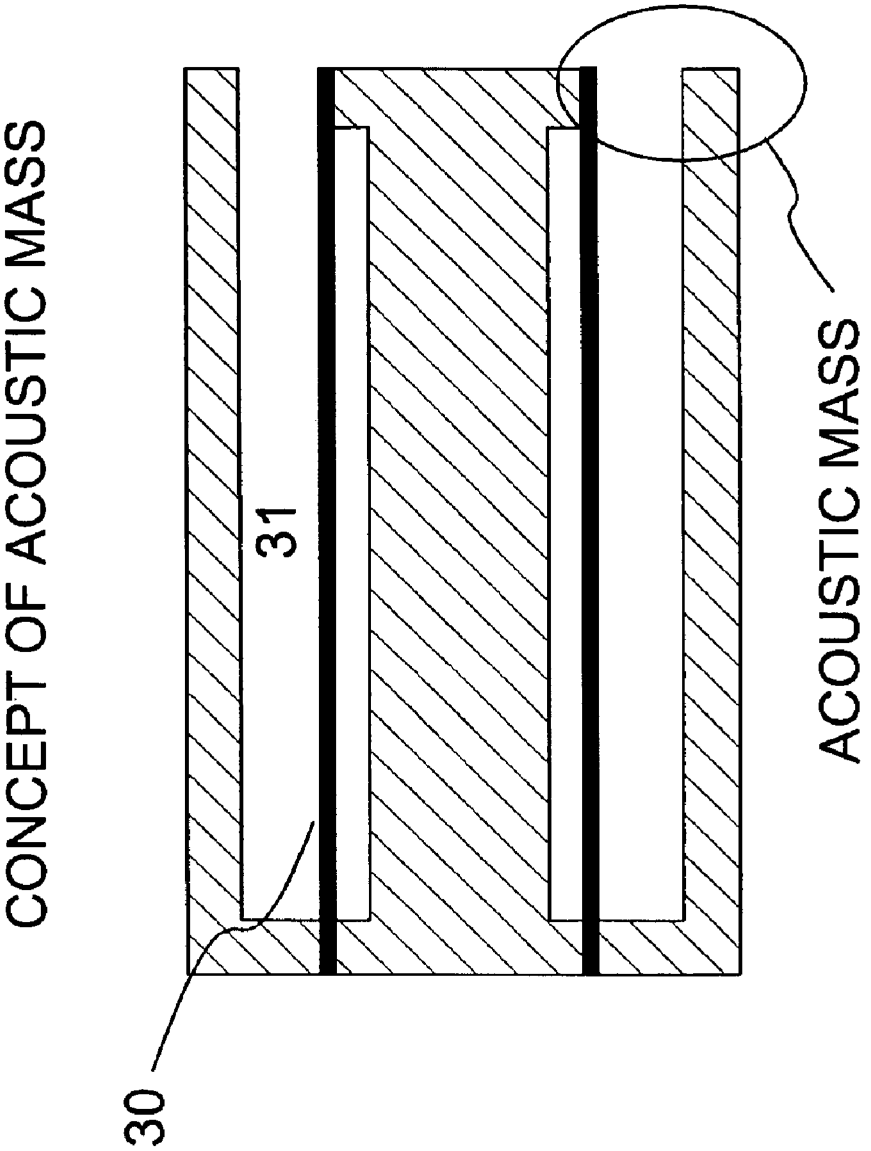

In the case of a cylindrical piezoelectric transducer as shown schematically in FIG. 3, it can be seen that the aforementioned tube corresponds to the acoustic channel 31 built up above the diaphragm 30. It can be now shown that the acoustic mass is effectively located at the extremities of said channel where the sound is exiting from the device. This is depicted in FIG. 3 with a circle showing the "concentration of the acoustic mass" to the end of the channel. Therefore, according to the invention having dimensions $a \geqq 0$ and $b \geqq 0$ (see FIG. 2) effectively reduces the acoustic mass seen by the diaphragm and, therefore, increases the efficiency of the sound transducer.

Figure 4:
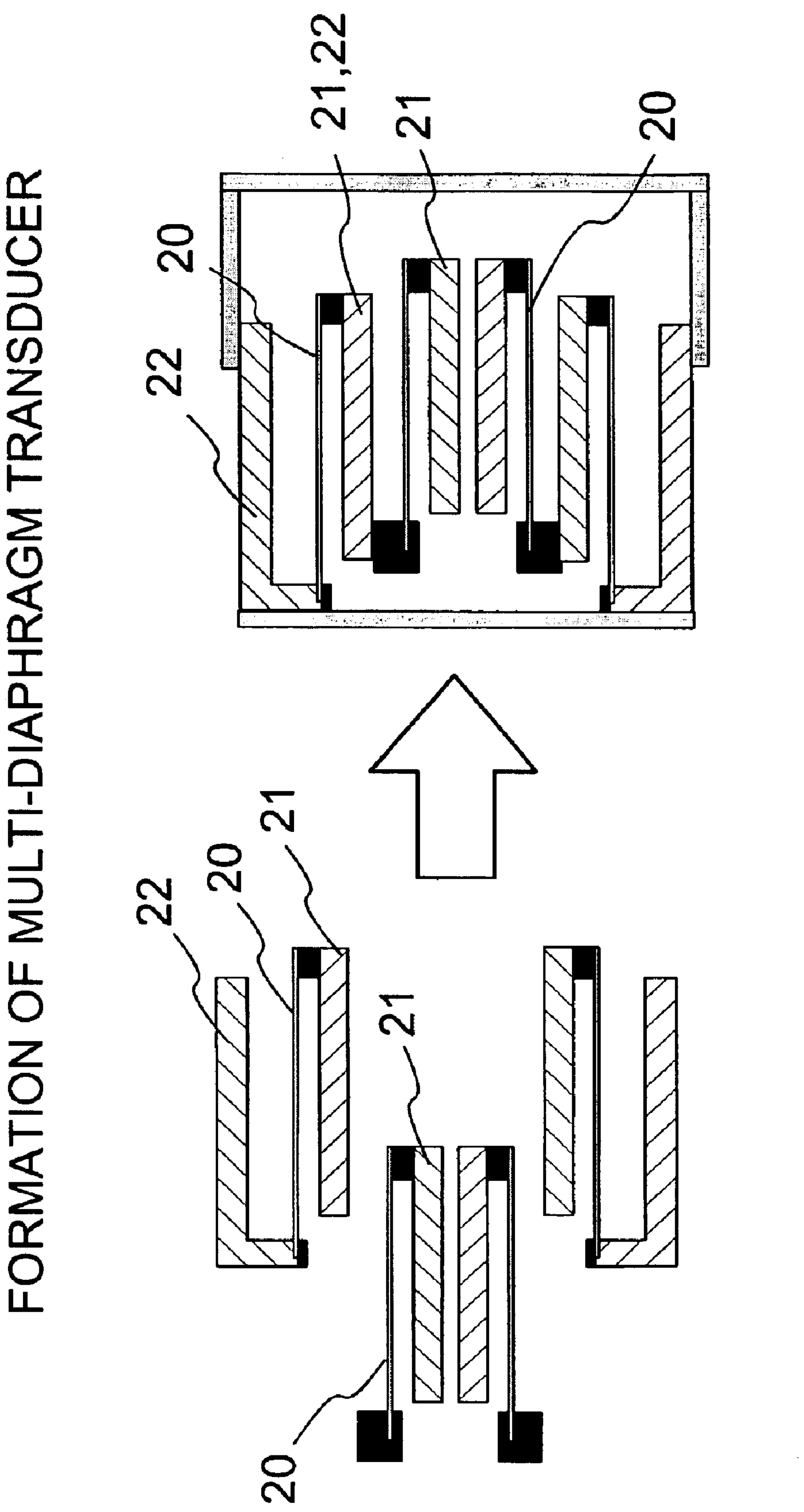

FIG. 4 describes schematically the idea of combining two sound units into a single multi-diaphragm sound transducer according to the invention and featuring the axial non-alignment for acoustic mass reduction. When two or more tubular sound unit structures (diaphragms) are arranged in acoustically parallel, the inner sound guiding sleeve of an outer sound unit can be used as the outer sound guiding sleeve of the following inner sound unit, and vice versa. This is evident for a person skilled in the art from FIG. 4. Conceptually, in concentrically arranged sound units the outer sound guiding sleeve of an inner unit can be thought to be replaced by the inner sound guiding sleeve of the following outer unit. In FIG. 4 on the right hand side this is schematically indicated by referring to said sleeve having the aforementioned double function simultaneously with two reference numerals 21,22.

It is obvious for a person skilled in the art, that any required number of sound units/diaphragms can be arranged in parallel following the same principle. Therefore, the current invention provides a completely new way combine the axial sound flow from several sound units together in order to increase the total sound level.

FIG. 4 depicts a certain, relatively modest axial non-alignment between the radially successive sound units so that the amount of the non-alignment corresponds closely to the axial dimensions of the front and rear retainers. Depending upon the specific application, the amount of non-alignment may be selected to have any suitable value larger than zero. The reduction in the acoustic mass "seen" by the diaphragms depends naturally on the amount of the non-alignment.

Figure 5:
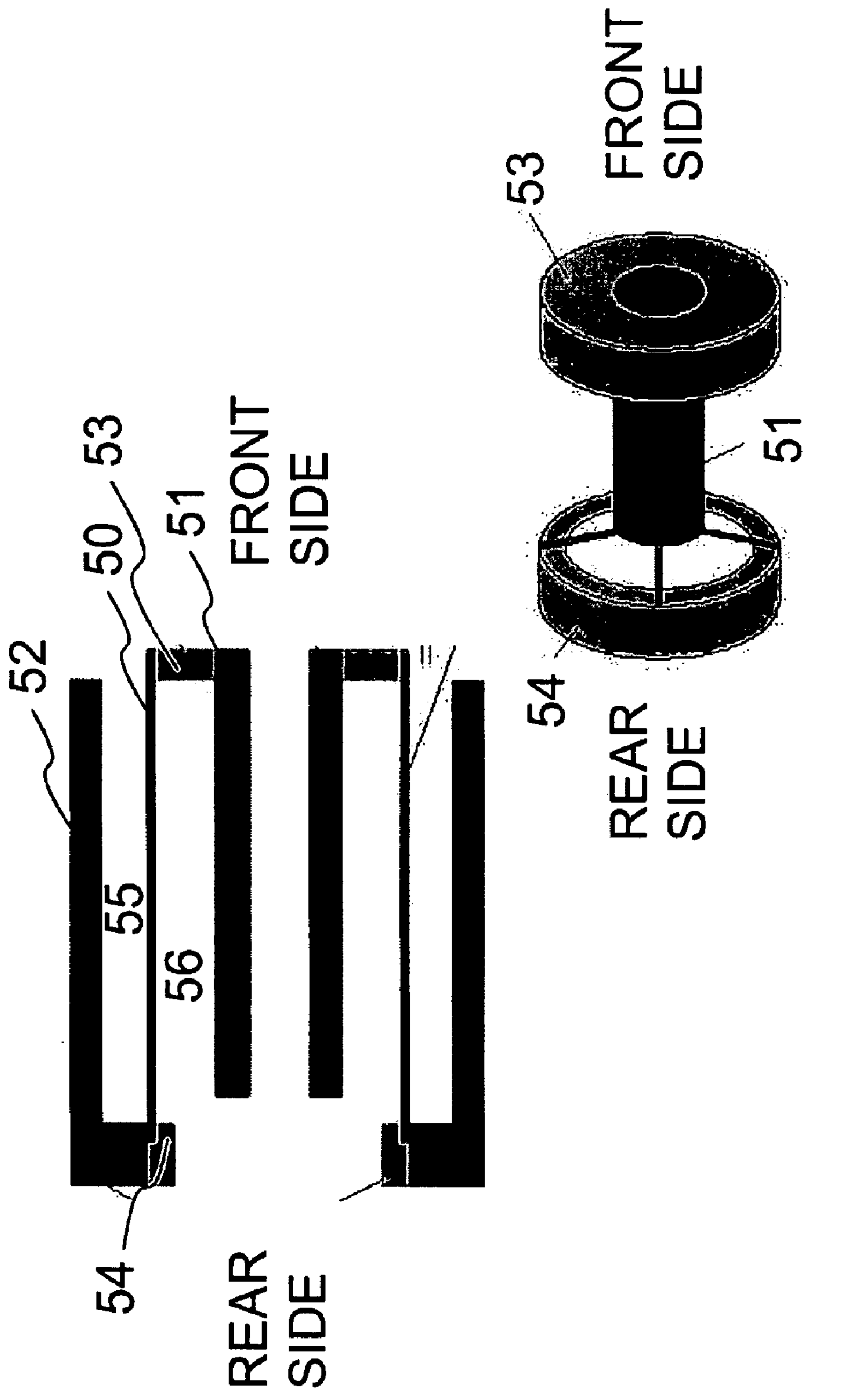

FIG. 5 describes schematically in a perspective view one possible way of constructing a sound transducer according to the invention. In FIG. 5 a single circular diaphragm 50 is arranged between an inner sleeve/frame 51 and outer sleeve/frame part 52. A front retainer ring 53 and a rear retainer ring 54 are arranged to hold the diaphragm 50 and said inner and outer sleeves/frames 51, 52 coaxially together so that a acoustic front channel 55 and a rear channel 56 are formed between said elements. The front and/or rear retainer rings 53, 54 are in this embodiment molded as separate individual parts and later on during the assembly of the device welded, glued or otherwise suitably attached with the inner and outer sleeve/frame parts 51, 52. The lower right hand corner of FIG. 5 shows the retainer rings 53, 54 attached with the inner sleeve/frame 51.

Alternatively, it is also possible, for example, to manufacture the entity 51,53,54 shown in the lower right hand corner of FIG. 5 by molding it directly as a single integrated part. Therefore, the invention should not in any way be taken to be limited by the different ways of manufacturing the sound transducer or related components.

While the invention has been shown and described above with respect to a few selected embodiments, it should be understood that these embodiments are only examples and that a person skilled in the art could construct other embodiments utilizing technical details other than those specifically disclosed herein while still remaining within the spirit and scope of the present invention. It should therefore be understood that various omissions and substitutions and changes in the mechanical, acoustic and electronic design of the sound units or the acoustic transducers illustrated, as well as in the operation of the same, may be made by those skilled in the art without departing from the spirit of the invention. It is the intention, therefore, to restrict the invention only in the manner indicated by the scope of the claims appended, hereto.

Each diaphragm of the transducers is preferably made as a cylindrical sheet of piezoelectric material. The diaphragm may be manufactured solely from said material, or it may be a composite structure incorporating said material as one of its elements.

When a diaphragm is supported with retainer rings or other supports arranged on the inner sound guiding sleeve, the diaphragm may be covered with lacquer, adhesive, glue or similar material in order to increase its rigidity. The same materials may be used, if necessary, for sealing/fixing the ends of the diaphragm to said supports, avoiding in this manner the interference between the sound wave produced by the inner surface of the diaphragm and the sound wave produced by the outer surface of the diaphragm. It is also obvious for a person skilled in the art that the supports supporting the diaphragm with respect to the inner and/or outer sound guiding sleeves may be arranged in several different ways. The axial width of the support means arranged to the axial ends of the diaphragm may partly or completely build up the required non-alignment, or the non-alignment may also be arranged independently of said widths.

Acoustic foam materials, different type of acoustic enclosures or baffles may be used both in the acoustic front and rear channels in order to transform the acoustic response of each sound unit/driver. Further, different electrical signals can be used to drive the different sound units in a multi-diaphragm transducer. These electrical drive signals may differ in their frequency bandwidth or equalization, or in their relative signal amplitude. Said drive signals may be generated from a common signal, for example, by directing the signal through a set of active or passive band division filters. Further, in a multi-diaphragm transducer the amount and also the direction of non-alignment in the radially successive sound units may be selected to be different. In other words the direction of the axial non-alignment may alternate from one radial unit to the next one in other to prevent the total length of the transducer from growing excessively.

Typical applications of the sound transducer according to the invention include acoustic applications, such as audio devices with one more internal or external loudspeakers, loudspeaker units (cabinets), stereo head phones, earpieces for a single ear, different type of headsets including hands-free sets. The sound transducers according to the invention are especially suitable for different type of portable or battery operated devices due to their compact size and low power consumption. Such features are important, for example, in different type of portable players (Compact Disc, MiniDisk, MP3) and wireless receivers. An important application field can be found among telecommunication devices and related accessories. The invention can be applied to mobile phones and different type of wireless data processing or gaming devices.

In audio applications the reproduced frequency range may be from 0–25 kHz. However, the invention is not limited purely to audio applications and audible frequencies, but it is also possible to use the acoustic transducer to generate higher frequency non-audible sounds, for example, in the ultrasound range.

The examples given above are mainly based on the use of piezoelectric diaphragms. However, the invention may also be implemented using other types of electromechanically converting materials such as electrostrictive, pyroelectric or electrostatic materials, which can be arranged in the way specified above, and arranged to vibrate as a sound generating diaphragm.

The shape of the various elements forming a single sound unit, i.e. the diaphragm and the inner/outer sleeves/frame parts is typically exactly circular and said elements are arranged exactly coaxially within each other. However, the invention is not limited only to such implementations, but said elements may also have non-circular forms such as elliptical or angular forms and the elements may also be arranged within each other somewhat acentrically. Further, said elements, and in particular the diaphragm, do not need to have a fully closed and uniform perimeter, i.e. for example the cross-sectional form of a single full circle or polygon, but rather each element may have one or more sectoral openings or parts in its cross-sectional form.

The basic idea of the current invention can be found in the use of the cylindrically or tubularly shaped electromechanical diaphragm within a similarly shaped acoustical sleeve/frame construction where the acoustic mass "seen" by the diaphragm is reduced by arranging a suitable amount of non-alignment between the diaphragm and the inner and/or outer sound guiding sleeves. Therefore the sound waves radiating out from the transducer substantially perpendicular to the displacement of said sound initially generating diaphragm have a less restricted channel than in the prior art devices.

What is claimed is:

1. A sound transducer comprising at least one sound unit based on at least one radially sound emitting diaphragm arranged in a substantially cylindrical or tubular form, said diaphragm consisting at least partly of electromechanically converting material capable of creating sound by changing its physical state upon electrical excitation, wherein within a single sound unit said diaphragm is arranged to be supported between an inner sound guiding sleeve and an outer sound guiding sleeve, said sleeves having substantially similar radial cross-sectional shape than said diaphragm, in order to form at least one axial acoustic channel between the diaphragm and at least one of said sleeves, so that the sound waves generated by the diaphragm are arranged to be guided along said acoustic channel out from the sound unit, and that at least at the exit side of said acoustic channel the axial ends of the diaphragm and the corresponding sound guiding sleeve are arranged to have mutual non-alignment in the plane perpendicular to the axis of the sound unit in order to reduce the acoustic mass that said acoustic channel represents.

2. A sound transducer of claim 1, wherein within a sound unit the inner sound guiding sleeve is arranged with at least one front retainer located at the front end side of said sleeve for supporting the diaphragm and said sleeve in a specified mutual radial and axial position, and at least one rear retainer is located at the other end of the diaphragm between the diaphragm and the outer sound guiding sleeve for supporting the diaphragm and said sleeve in a specified mutual radial and axial position, and that the axial widths of said front or rear retainers are arranged to be taken into account in the formation of said mutual non-alignment for the reduction of acoustic mass.

3. A sound transducer of claim 1, wherein several sound units are arranged in a radially successive manner within each other in order to form a multi-diaphragm radially arranged transducer with several sound units coupled acoustically substantially in parallel.

4. A sound transducer of claim 3, wherein in a radially arranged transducer the inner sound guiding sleeve of an outer sound unit is arranged to function as the outer sound guiding sleeve of the radially successive inner sound unit, and vice versa.

5. A sound transducer of claim 3, wherein in a radially arranged transducer the radially successive sound units have circular radial cross-sectional shapes and are arranged within each other concentrically having a common longitudinal axis of symmetry.

6. A sound transducer of claim 3, wherein in a radially arranged transducer the amount of axial non-alignment between the radially successive sound units is selected to be different at least between two sound units.

7. A sound transducer of claim 3, wherein in a radially arranged transducer the direction of axial non-alignment between the radially successive sound units is selected to be different at least between two sound units.

8. A sound transducer of claim 3, wherein in a radially arranged transducer at least the diaphragms of two different sound units are arranged to be driven with different electrical drive signals.

9. A sound transducer of claim 8, wherein said electrical drive signals differ in their frequency bandwidth.

10. A sound transducer of claim 8, wherein said electrical drive signals differ in their relative signal amplitude.

11. A sound transducer of claim 1, wherein said at least one diaphragm is partly or completely made out of one or more of the following materials: piezoelectric material, electrostrictive material, pyroelectric material or electrostatic material.

12. A sound transducer of claim 11, wherein said at least one diaphragm is partly or completely made out of polyvinylidene fluoride.

13. A sound transducer of claim 2, wherein in a single sound unit said front and/or said rear retainer together with said inner sound guiding sleeve form a single integrated part.

14. A sound transducer of claim 1, wherein the inner and outer sound guiding sleeves in a sound unit are partly or completely made out of one or more of the following rigid materials: plastic material or metal material.

15. A device with acoustic capabilities comprising at least one sound transducer with at least one sound unit based on at least one radially sound emitting diaphragm arranged in a substantially cylindrical or tubular form, said diaphragm consisting at least partly of electromechanically converting material capable of creating sound by changing its physical state upon electrical excitation, wherein within a single sound unit said diaphragm is arranged to be supported between an inner sound guiding sleeve and an outer sound guiding sleeve, said sleeves having substantially similar radial cross-sectional shape than said diaphragm, in order to form at least one axial acoustic channel between the diaphragm and at least one of said sleeves, so that the sound waves generated by the diaphragm are arranged to be guided along said acoustic channel out from the sound unit, and that at least at the exit side of said acoustic channel the axial ends of the diaphragm and the corresponding sound guiding sleeve are arranged to have mutual non-alignment in the plane perpendicular to the axis of the sound unit in order to reduce the acoustic mass that said acoustic channel represents.

16. A device of claim 15, wherein in a sound transducer several sound units are arranged in radially successive manner within each other in order to form a multi-diaphragm radially arranged transducer with several sound units coupled acoustically substantially in parallel.

17. A device of claim 16, wherein in a radially arranged transducer said sound units have circular radial cross-sectional shape and are arranged within each other concentrically having common longitudinal axis of symmetry.

18. A device of claim 16, wherein in a radially arranged transducer the direction of axial non-alignment between the radially successive sound units is selected to be different at least between two sound units.

19. A device of claim 15 wherein said at least one diaphragm of at least one sound unit in a sound transducer is partly or completely made out of one or more of the following materials: piezoelectric material, electrostrictive material, pyroelectric material or electrostatic material.

20. A device of claim 19, wherein said at least one diaphragm is partly or completely made out of polyvinylidene fluoride.

21. A device of claim 15, wherein said device is a device comprising one or more loudspeakers.

22. A device of claim 15, wherein said device is a portable audio device.

23. A device of claim 22, wherein said device is a portable player or receiver.

24. A device of claim 15, wherein said device is a headphone or headset comprising sound transducers separately for both ears of a listener.

25. A device of claim 15, wherein said device is an earpiece for a single ear of a listener.

26. A device of claim 15, wherein said device is a handsfree set.

27. A device of claim 15, wherein said device is a telecommunication device.

28. A device of claim 27, wherein said device is a mobile telecommunication device.

* * * * *